United States Patent [19]
Hu

[11] Patent Number: 5,852,773
[45] Date of Patent: Dec. 22, 1998

[54] PSTN TRANSACTION PROCESSING NETWORK EMPLOYING WIRELESS CONCENTRATOR/CONTROLLER

[75] Inventor: Michael W. Hu, Menlo Park, Calif.

[73] Assignee: Wireless Transactions Corporation, Sunnyvale, Calif.

[21] Appl. No.: 525,965

[22] Filed: Sep. 7, 1995

Related U.S. Application Data

[63] Continuation-in-part of Ser. No. 380,776, Jan. 30, 1995, Pat. No. 5,722,066.

[51] Int. Cl.⁶ .................................................. H04Q 7/20
[52] U.S. Cl. .......................... 455/403; 455/406; 455/557
[58] Field of Search .................................. 455/403, 406, 455/407, 408, 426, 550, 554, 557, 561, 556; 379/91.01, 93.12

[56] References Cited

U.S. PATENT DOCUMENTS

| | | |
|---|---|---|
| 4,776,003 | 10/1988 | Harris . |
| 4,837,800 | 6/1989 | Freeburg et al. ........................ 455/557 |
| 4,860,341 | 8/1989 | D'Avello et al. . |
| 4,890,315 | 12/1989 | Bendixen et al. . |
| 4,972,457 | 11/1990 | O'Sullivan ............................... 455/558 |
| 5,208,446 | 5/1993 | Martinez .............................. 455/406 X |
| 5,406,615 | 4/1995 | Miller, II et al. ....................... 455/436 |
| 5,490,060 | 2/1996 | Malec et al. ............................ 455/2 X |
| 5,497,424 | 3/1996 | Vanderpool ........................ 455/403 X |

*Primary Examiner*—Dwayne D. Bost
*Assistant Examiner*—William G. Trost
*Attorney, Agent, or Firm*—Townsend & Townsend & Crew; Henry K. Woodward

[57] ABSTRACT

A business transaction network including a wireless communication link for coupling a plurality of card transaction terminals to a host computer through a limited number of lines connected to the public switched telephone network (PSTN). The wireless link includes interface units for interfacing with the terminals and with the PSTN and encoding and decoding digital data based on analog signals from the terminals and from the PSTN, and spread spectrum wireless transceivers. A wireless concentrator/controller polls the plurality of terminals and selectively connects terminals to the PSTN through one of the telephone lines.

14 Claims, 5 Drawing Sheets

PSTN TRANSACTION PROCESSING NETWORK EMPLOYING WIRELESS CONCENTRATOR/CONTROLLER

This patent application is a continuation-in-part of application Ser. No. 08/380,776 filed Jan. 30, 1995 for "PSTN TRANSACTION PROCESSING NETWORK EMPLOYING WIRELESS TRANSCEIVERS," now U.S. Pat. No. 5,722,066.

BACKGROUND OF THE INVENTION

This invention relates generally to business transaction networks which use the public switched telephone networks (PSTN) to connect a transaction terminal to a computer processing center, and more particularly the invention relates to such a network which employs wireless transceivers to connect a remote location to the PSTN.

Many credit, debit, and stored value card processing systems have been installed in which a card transaction terminal at a point of sale is connected to the dial-up public switched telephone network (PSTN) for the purpose of authorizing a payment transaction and then capturing the sales transaction information for submission to a clearing and settlement processing service.

Conventional card transaction terminal units include point of sale (POS) terminals, electronic cash registers (ECRs), electronic benefits transfer terminals (EBTs), automatic teller machines (ATMs), plus other devices that obtain sales transaction data that in turn is stored, processed, and transmitted through the PSTN communication network. This network provides a low cost alternative for merchants with small to medium transaction volume to authorize a sales transaction on-line.

Typically the cardholder account number, merchant identification, card issuer number, card expiration date, transaction amount and other card information pertaining to the sales transaction are entered into the terminal unit. In many cases some of the data is obtained electronically by swiping the card (if it has a magnetic stripe) through a magnetic stripe card reader. Other transaction information, including the transaction amount, is keyed into the terminal unit by the sales cashier using a key pad.

A difficulty with conventional credit inquiry and draft capture systems is that there are many locations at the point of sale which do not have readily available a dial-up communication link to the public switched telephone network. The cost and inconvenience of extending the communication wiring to certain cashier positions would be too expensive and in some cases not feasible. Such locations include street fairs, convention centers, hotel lobbies, airport concourses, stadiums and parking lots where installation of new wirings can be prohibitive or impossible. This limitation prevents the merchant or retailer from being able to accept any form of payment, other than cash, for the sale without accepting the risk of default on the part of the purchaser. Essentially, it limits the merchant or retailer to cash sales only. This restriction significantly limits the potential sales for some merchants or would expose them to unreasonable risk in accepting a card payment if it cannot be authorized.

Copending application Ser. No. 08/380,776, supra, is directed to eliminating the need for a point-to-point wire connection between a card transaction terminal and the PSTN network to the card processing center (FIG. 1), and thereby increasing the flexibility in using the card transaction terminal in presently inaccessible location (FIG. 2). The significance of these invention is the introduction of the concept of using the license free Instrumentation, Scientific, and Medical (ISM) frequency bands specifically allocated by the Federal Communications Commission (FCC) for spread spectrum radio operation. However, in a multiple card transaction terminal environment such as in a store with multi-lane checkouts or many individual vendors in a shopping mall, the cost of using point-to-point wireless transceiver pairs for wireless connection between multiple card transaction terminals and the PSTN network can be further reduced by taking advantage of the fact that not all card transaction terminals need access to the PSTN at the same time.

SUMMARY OF THE INVENTION

The present invention is directed not only at eliminating the need for multiple wire connection between multiple card transaction terminals and the PSTN network, but also at reducing the number of wireless transceivers required at the telephone connection to the PSTN network and therefore reducing the total telephone lines required. The invention uses a polling access method for multiple card transaction terminals to access wirelessly to a few telephone lines connected to the PSTN network.

More particularly, the polling access method is accomplished by a Wireless Concentrator Controller (WCC) connected to a few telephone lines to the PSTN network. The main function of the WCC is to continuously poll the individual wireless transceivers and determine whether any card transaction terminal needs access to the PSTN network. The WCC monitors and directs the traffic flow of information between the wireless transceivers connected to the card transaction terminals and through the PSTN network to the card processing center. Whenever the number of card transaction terminals that need to access to the PSTN network exceeds the number of telephone lines available for the WCC to use, the WCC then queues the requests from the card transaction terminals to be processed by the WCC when a telephone line becomes available. The number of concurrent sessions between the card transaction terminals and the card processing center is limited by the number of telephone lines that are physically connected to the WCC.

In a preferred embodiment, the passage of information between the multiple card transaction terminals and the PSTN network via the wireless transceivers and the WCC is in accordance with the Bell modem 212A/CCITT V.22 standards. Furthermore, the spread spectrum transceivers complies with the FCC Part 15.247 rules for license free operation.

The invention and objects and features thereof will be more readily apparent from the following detailed description and appended claims when taken with the drawing.

DETAILED DESCRIPTION OF ILLUSTRATIVE EMBODIMENTS

Figure 1:
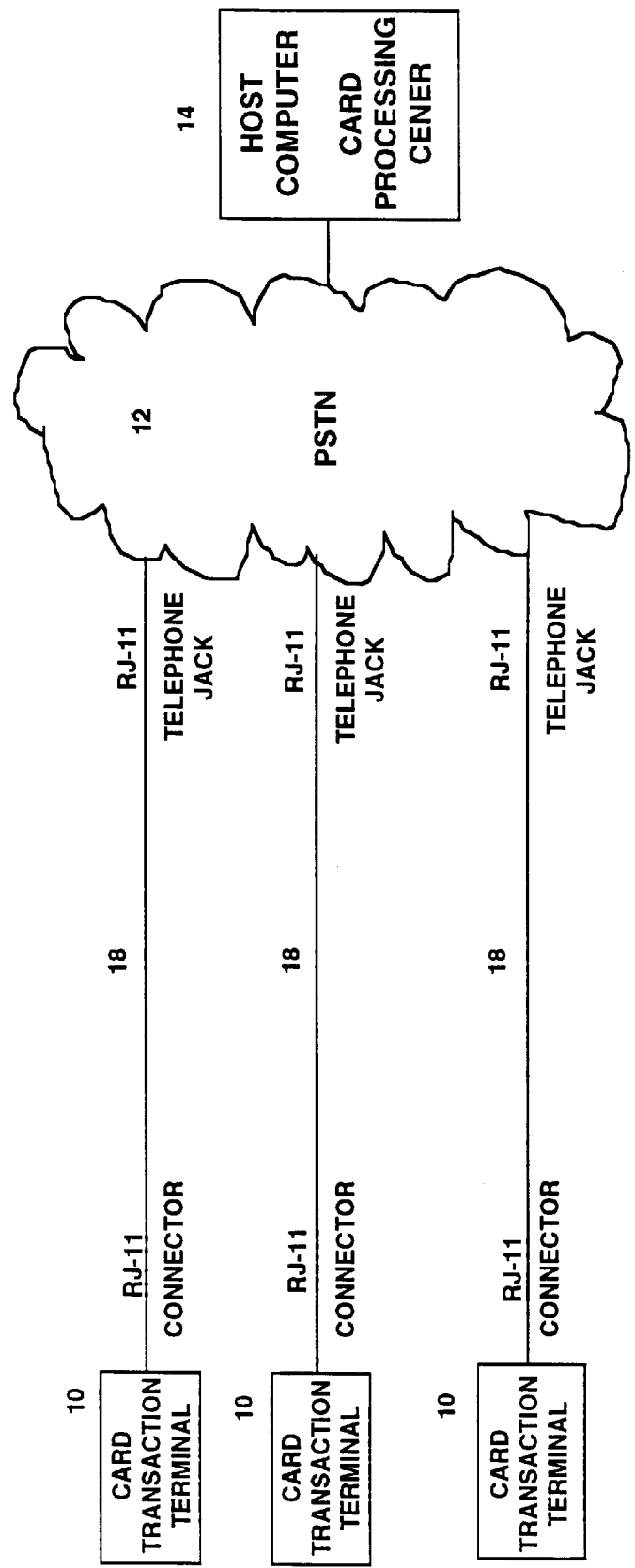
FIG. 1 illustrates a prior art business transaction network in which multiple card transaction terminals are directly connected by cable to the PSTN and a host computer for authorization of card sales transactions.

FIG. 1 illustrates the conventional business transaction network interconnecting a card transaction terminal to a host computer through the PSTN. The typical sequence of events after a card is swiped on the card transaction terminal includes: Terminal 10 dials out on PSTN 12 to a destination host computer 14 at the card processing center. Once the telephone connection is made, the host computer polls the card transaction terminal to send a transaction for approval. After verification, host computer 14 sends the authorization back to the card transaction terminal 10. The transaction session ends after host computer 14 receives an acknowledgment back from the card transaction terminal verifying that the terminal successfully received the authorization response. A cable 18 directly connects an RJ-11 connector on terminal 10 to an RJ-11 telephone jack in the PSTN.

Figure 2:
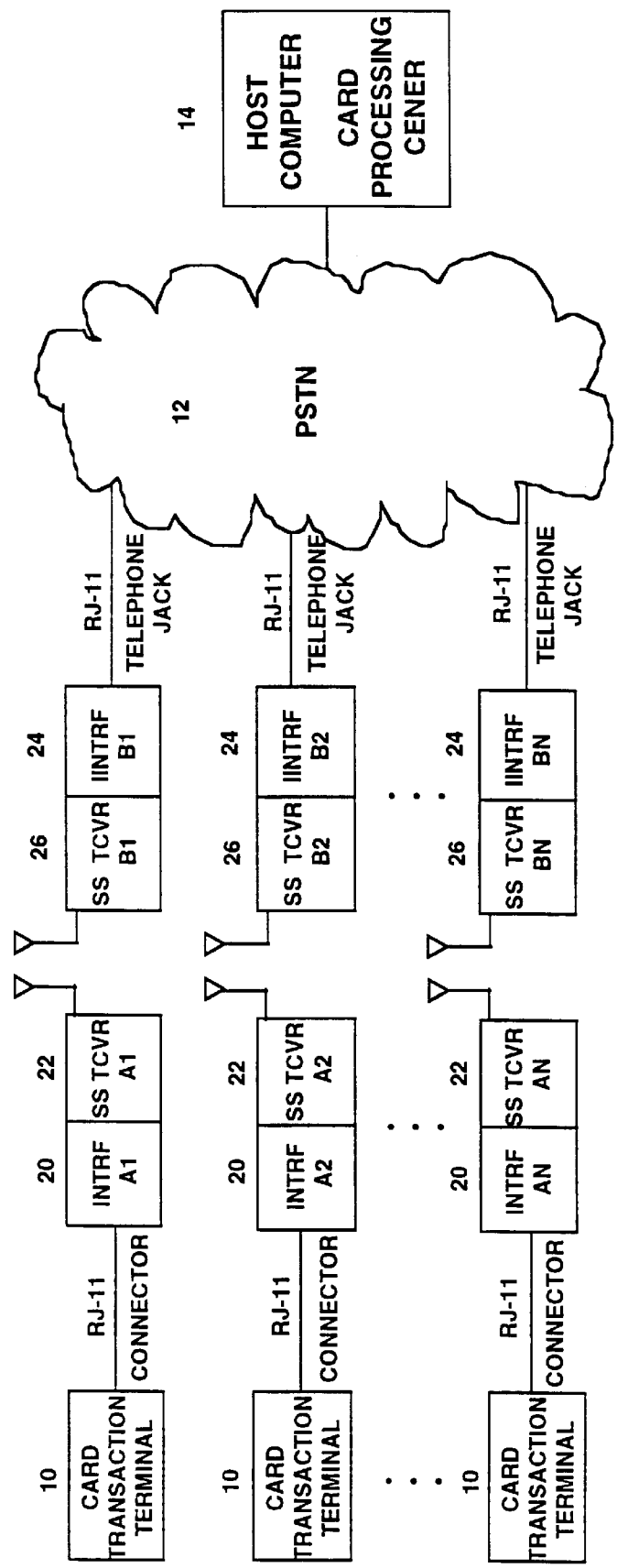
FIG. 2 illustrates a business transaction network in accordance with the invention in which multiple radio transceivers interconnect the card transaction terminals and the PSTN.

FIG. 2 illustrates a transaction network as modified in accordance with the invention of copending application Ser. No. 08/380,776, supra. The cables 18 in FIG. 1 are replaced by pairs of unique interfaces and transceivers. The first interface 20, is between the RJ-11 output of card transaction terminal 10 and a Spread Spectrum Transceiver 22 (SS TCVR A). The second interface 24 is between the Spread Spectrum Transceiver 26 and the RJ-11 telephone jack that interfaces with the PSTN.

Figure 3:
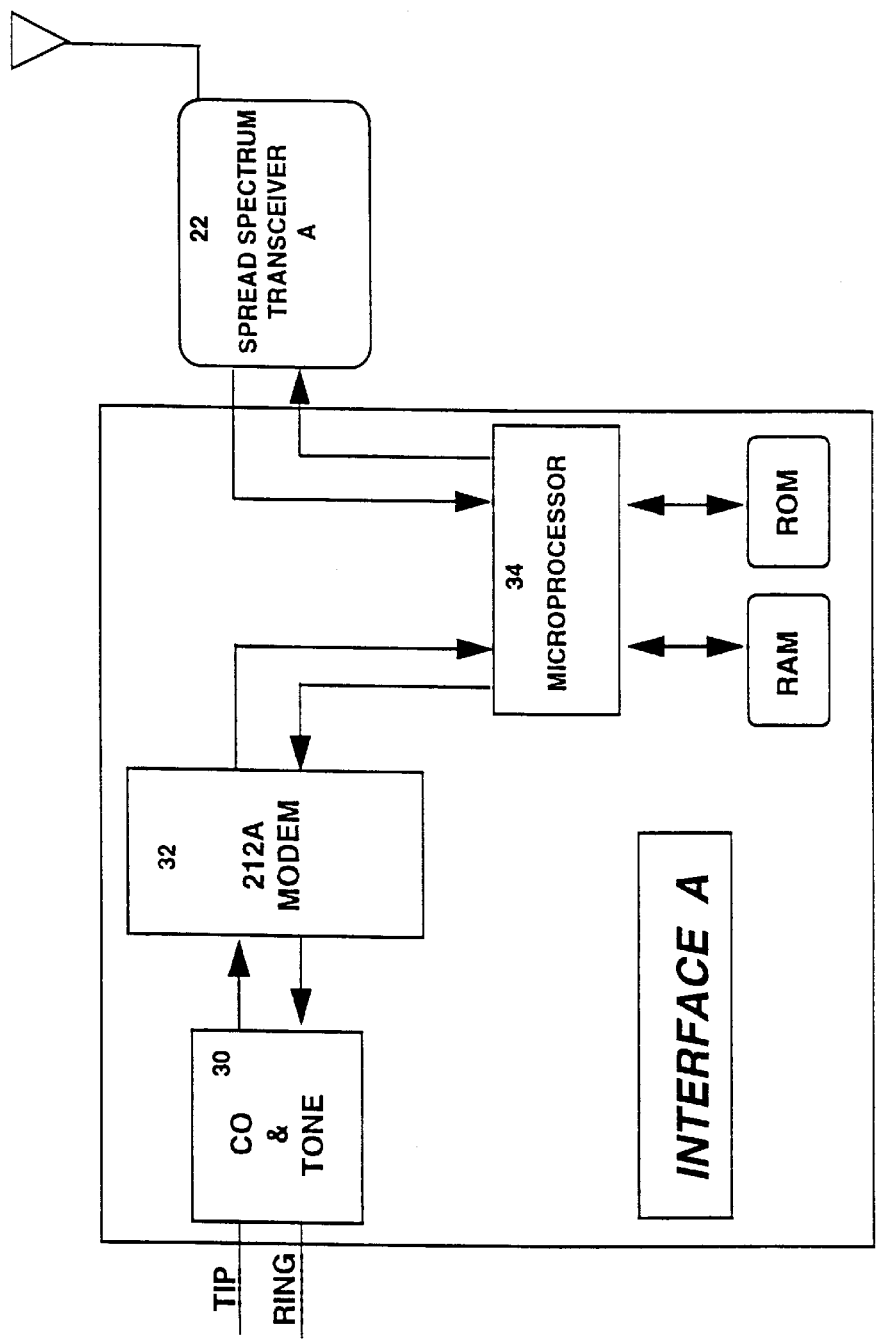
FIG. 3 is a functional block diagram of a terminal interface in the network of FIG. 2.

A functional block diagram of interface 20 is shown in FIG. 3. The "CO and Tone" block 30 provides the circuitry to sense the loop current from "Tip" and "Ring" for the detection of "off-hook," "on-hook," and "ring" generation and also provides "dial-tone," "busy," or "ring" signal tones to the card transaction terminal. Implementation of block 30 circuitry is known in the art using commercially available components. The modem 32 (Bell 212A/CCITT V.22) converts the modulated analog signals into digital information. The microprocessor 34 decodes all the modem signals including off-hook, on-hook, dial-tone, ring, busy, and the sales transaction data, and encodes them to the appropriate protocol and packetized data format required by the Spread Spectrum Transceiver 22. The procedure is reversed for communication from the host computer through the PSTN to the transaction terminal.

Figure 4:
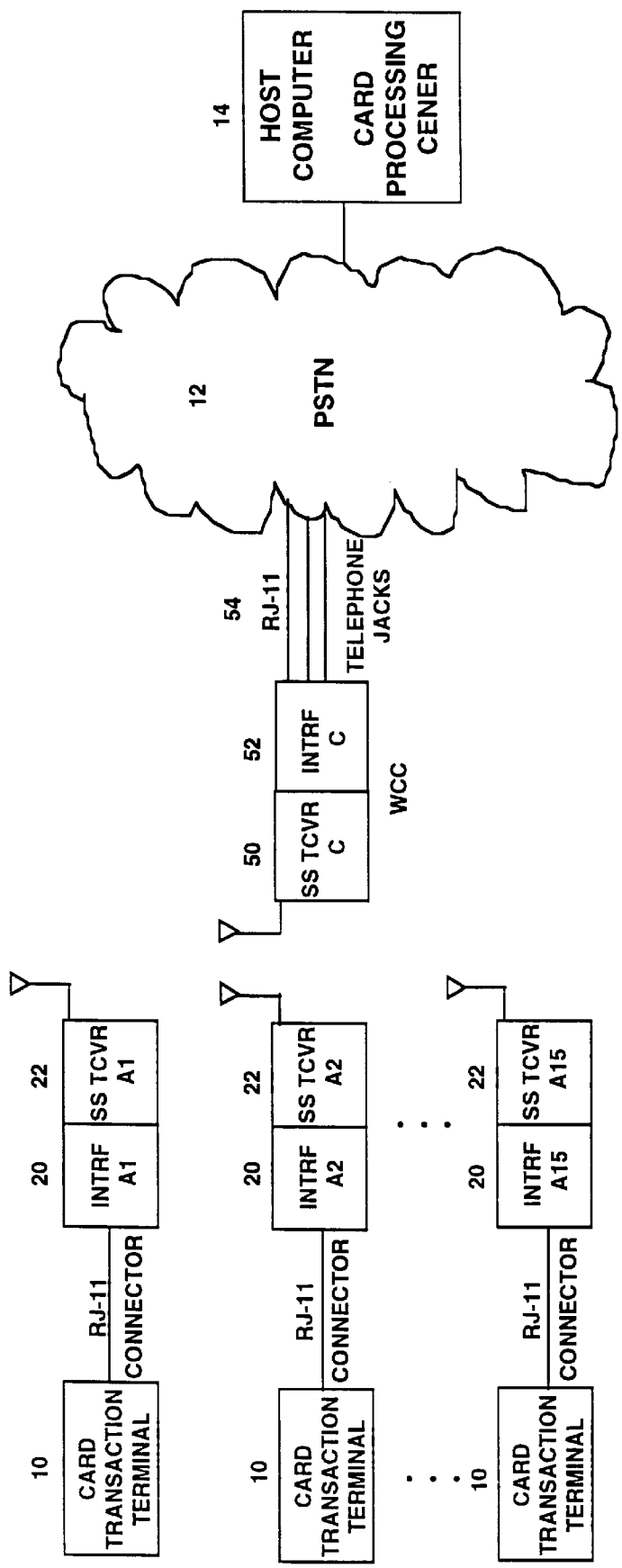
FIG. 4 illustrates a business transaction network in accordance with the invention in which multiple card transaction terminals connected to radio transceivers communicate through a Wireless Concentrator Controller (WCC) that is connected to the PSTN.

FIG. 4 illustrates a business transaction network with multiple card transaction terminals connected to the spread spectrum radio transceivers which communicate with a Wireless Concentrator Controller (WCC) connected to the PSTN, in accordance with the present invention. The WCC includes a spread spectrum transceiver 50 and a PSTN interface 52. The WCC polls the multiple card transaction terminals and provides access thereof to a limited number of telephone lines 54 connected to the PSTN network.

Figure 5:
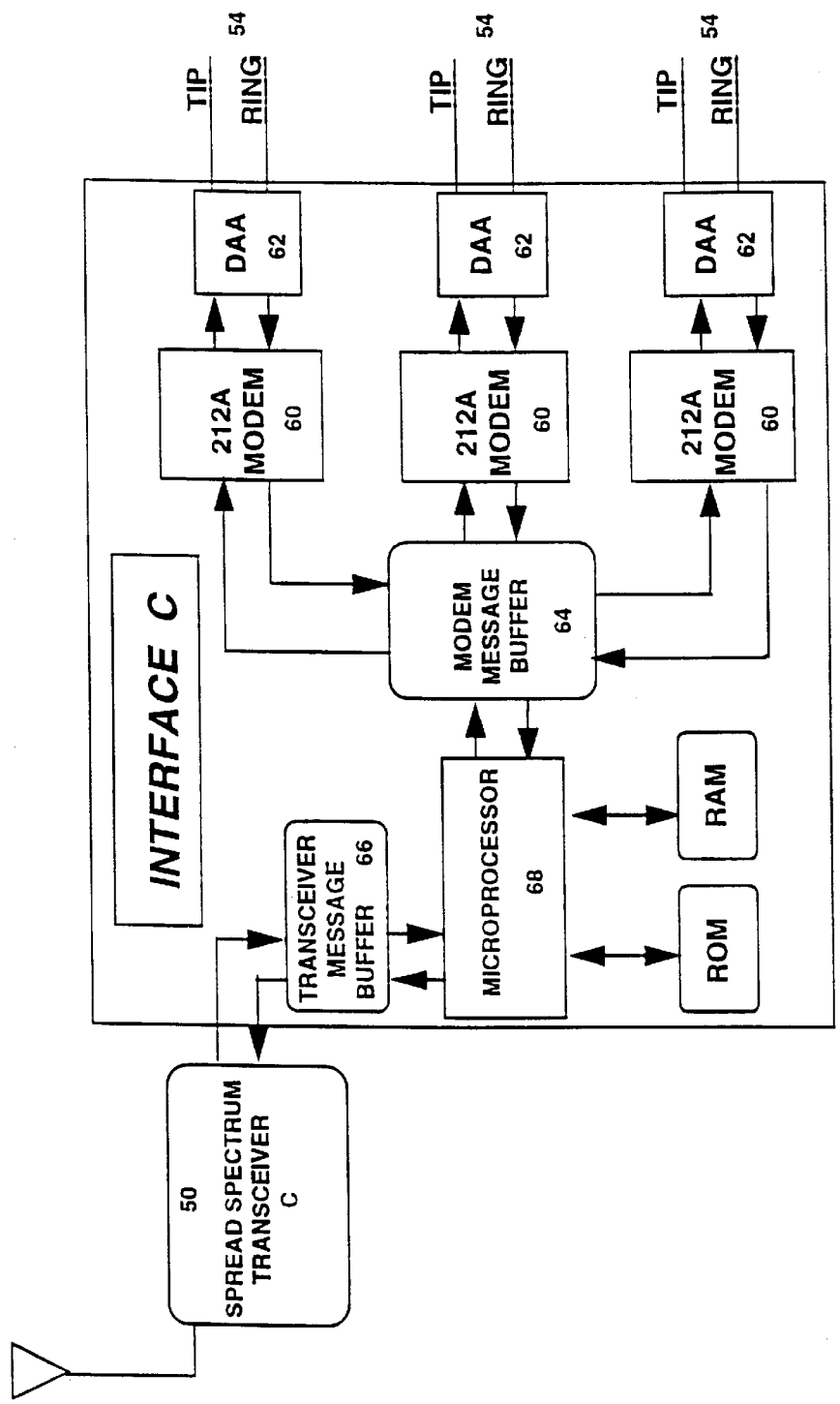
FIG. 5 is a functional block diagram of the Wireless Concentrator Controller (WCC) interface in the network of FIG. 4.

FIG. 5 shows the block diagram of the interface 52 inside of the WCC. Interface 52 contains three modems 212A labeled 60 and associated DAA circuits 62, a modem message buffer 64, a transceiver message buffer 66, and a microprocessor 68 that manages all information traffic flow between the SS TCVR C 50 and three telephone lines 54. Micro processor 68 also performs polling of all the SS transceivers 22.

A typical sequence of events may happen as follows: A credit card is swiped on a card transaction terminal, the terminal sends "off-hook" signal, interface 22 (FIG. 2) posts a request flag "REQ1" and waits. WCC polls all transceivers 22 (SS TCVR A1 through SS TCVR A15) once every second. When WCC polls SS TCVR A1 and it detects the "REQ1" flag, WCC then starts the sequence by gaining access to one of the three available telephone lines 54. Since a typical card authorization transaction can take up to 15 to 20 seconds to complete, the WCC has time to process and to monitor the entire transaction sequence, and to continue polling SS TCVR A2 through SS TCVR A15. During this time, another credit card is swiped on another card transaction terminal connected to interface A2, the terminal sends an "off-hook" signal, and interface A2 posts a request flag "REQ2" and waits. When WCC polls SS TCVR A2 and detects the "REQ2" flag, it then starts another sequence by gaining access to the next available telephone line 54. At this instance of time, there are two card authorization transactions in progress. The WCC processes all sequences between the two transaction terminals and the card processing center via the PSTN, SS TCVR A1, SS TCVR A2, and SS TCVR C. Meanwhile, the WCC continues to poll SS TCVR A3 through SS TCVR A15. During this time, another card is swiped on the a third card transaction terminal connected to the interface A15, the terminal sends an "off-hook" signal, interface A15 posts a request flag "REQ15," and then waits. When WCC polls SS TCVR A15 and detects "REQ15" flag, it then starts a sequence by gaining access to the third and last available telephone line. At this point in time the WCC is processing and monitoring three concurrent transaction sessions between the three card transaction terminals and the card processing centers, and still manages to poll SS TCVR A3 through TCVR A14.

Assume no card authorization transaction has been completed within the typical 15 to 20 second window, and fourth and fifth cards are swiped on the card transaction terminal connected to interface A4 and interface A5. The terminals send "off-hook" signals and interface A4 and interface A5 post "REQ4" and "REQ5" flags and then wait. When WCC polls SS TCVR A4 and SS TCVR A5 and detects "REQ4" and "REQ5" flags, and since all the telephone lines are in use, the WCC will hold those requests in a queue in buffer 66 and it will start processing those requests as soon as telephone lines become available. If no telephone line becomes available, the card transaction terminal may time-out. If this happens, the card transaction terminals must redial.

In this illustrative embodiment, the WCC is limited to polling fifteen SS TCVRs and handling three telephone lines. In a general case, the WCC can be made to poll more SS TCVRs and handle more telephone lines. The limitation is only in the processing speed of microprocessor, memory size, the response time required over the entire network, and the market acceptance of a more costly WCC.

In this illustrative embodiment, a polling access method allows multiple card transaction terminals to be connected to the PSTN and to card processing center via spread spectrum transceivers, but many other media access methods such as the Time Division Multiple Access (TDMA), Carrier Sense Multiple Access (CSMA), and others may be deployed. The implementation of other media access methods may be application and market requirement dependent.

Thus while the invention has been described with reference to a specific embodiment, the description is illustrative of the invention and is not limiting the invention. Various modifications and applications may occur to those skilled in the art without departing from the true spirit and scope of the invention as defined by the appended claims.

What is claimed is:

1. A local area wireless business transaction network requiring no FCC site license comprising:
   a) a plurality of standard unmodified card transaction terminals for receiving customer information from customer cards, each terminal including an RJ-11 telephone line connector,
   b) first interfaces including RJ-11 connectors for mating with said telephone line connectors of said terminals and converting analog signals from said terminals to encoded digital signals and for decoding digital signals going to said terminals to analog signals, and circuitry for sensing loop current from Tip and Ring for the detection of off-hook and on-hook conditions and for providing dial-tone, busy, and ring signals to said terminal,
   c) first spread spectrum wireless transceivers connected with said first interfaces for transmitting encoded digital signals from said first interfaces and for receiving encoded digital signals for said first interfaces,
   d) a public switched telephone network and having a plurality of network connectors including at least one network connector connected to a centrally located computer processing center,
   e) a second interface including at least one RJ-11 connector for mating with one of said network connectors and converting encoded digital signals to analog signals going to said network connector and converting analog signals from said network connector to encoded digital signals, said second interface including means for polling each of said first interfaces and for selectively connecting signals from said first interfaces to said public switched telephone network through said network connector, and
   f) a second spread spectrum wireless transceiver connected with said second interface for transmitting encoded digital signals from said second interface to said first wireless transceivers and for receiving encoded digital signals for said second interface from said first wireless transceivers.

2. The business transaction network as defined by claim 1 wherein each interface includes at least one modem for converting analog signals to digital signals and digital signals to analog signals, and a microprocessor for decoding received signals from a wireless transceiver and encoding signals for transmission by the wireless transceiver.

3. The business transaction network as defined by claim 2 wherein said second interface further includes a transceiver message buffer and a modem message buffer.

4. The business transaction network as defined by claim 1 wherein said wireless transceivers operate in the Instrumentation, Scientific and Medical frequency bands.

5. The business transaction network as defined by claim 1 wherein said wireless transceivers operate in the Instrumentation, Scientific and Medical frequency bands.

6. The business transaction network as defined by claim 2 wherein said second interface further includes a data access arrangement a s protective interface circuitry for said public switched telephone network.

7. In a local area wireless business transaction network requiring no FCC site license and in which card transaction terminals communicate with a host computer through a public switched telephone network, said network comprising first interfaces each including an RJ-11 connector for mating with a telephone line connector of a terminal and converting analog signals from the terminal to encoded digital signals and for converting encoded digital signals going to the terminal to analog signals, and circuitry for sensing loop current from Tip and Ring for the detection of off-hook and on-hook conditions and for providing dial-tone, busy, and ring signals to said terminal, first spread spectrum wireless transceivers connected with said first interfaces for transmitting encoded digital signals from said first interfaces and for receiving encoded digital signals for said first interfaces, a second interface including at least one RJ-11 connector for mating with a network connector of the public switched telephone network and converting encoded digital signals to analog signals going to the public switched telephone network and converting analog signals from the public switched telephone network to encoded digital signals, said second interface including means for polling each of said first interfaces and for selectively connecting signals from said first interfaces to said public switched telephone network through said network connectors, and a second spread spectrum wireless transceiver connected with said second interface for transmitting encoded digital signals from said second interface to said first wireless transceivers and for receiving encoded digital signals for said second interface from said first wireless transceivers.

8. The communication link as defined by claim 1 wherein said wireless transceivers operate in the Instrumentation, Scientific and Medical frequency bands.

9. The communication link as defined by claim 7 wherein each interface includes at least one modem for converting analog signals to digital signals and digital signals to analog signals, and a microprocessor for decoding received signals from a wireless transceiver and encoding signals for transmission by the wireless transceiver.

10. The communication link as defined by claim 9 wherein said second interface further includes a data access arrangement as protective interface circuitry for said public switched telephone network.

11. The communication link as defined by claim 10 wherein said second interface further includes a transceiver buffer and a modem message buffer.

12. For use in a local area wireless business transaction network requiring no FCC site license and in which card transaction terminals communicate with a host computer through a public switched telephone network, said network comprising
   an interface unit including at least one RJ-11 connector for mating with a network connector of the public switched telephone network and converting encoded digital signals to analog signals going to the public switched telephone network and converting analog signals from the public switched telephone network to encoded digital signals, said interface unit including means for polling each transaction terminal and for selectively connecting signals from said transaction terminals to said public switched telephone network through said network connectors, a modem for converting analog signals to digital signals and digital signals to analog signals, and a microprocessor for decoding received signals from said wireless transceiver and encoding signals for transmission by said wireless transceiver, and a wireless spread spectrum transceiver connected with said interface unit for transmitting encoded digital signals to said transaction terminals and for receiving encoded digital signals from said transaction terminals.

13. The communication link as defined by claim 12 wherein said interface unit further includes a transceiver buffer and a modem message buffer.

14. The communication link as defined by claim 13 wherein said interface unit further includes a data access arrangement as protective interface circuitry for said public switched telephone network.

* * * * *